(12) United States Patent
Ishida et al.

(10) Patent No.: US 8,551,655 B2
(45) Date of Patent: Oct. 8, 2013

(54) NEGATIVE ACTIVE MATERIAL FOR SECONDARY LITHIUM BATTERY AND SECONDARY LITHIUM BATTERY

(75) Inventors: Sumihito Ishida, Yongin-si (KR);
Hee-Joong Kim, Yongin-si (KR);
Hyun-Uk Jo, Yongin-si (KR);
Deok-Hyun Kim, Yongin-si (KR);
Jong-Ki Lee, Yongin-si (KR);
Seok-Gyun Woo, Yongin-si (KR)

(73) Assignee: Samsung SDI Co., Ltd., Yongin-si, Gyeonggi-di (KR)

( * ) Notice: Subject to any disclaimer, the term of this patent is extended or adjusted under 35 U.S.C. 154(b) by 385 days.

(21) Appl. No.: 12/947,789

(22) Filed: Nov. 16, 2010

(65) Prior Publication Data

US 2012/0009473 A1 Jan. 12, 2012

Related U.S. Application Data

(60) Provisional application No. 61/362,200, filed on Jul. 7, 2010.

(51) Int. Cl.
*H01M 4/13* (2010.01)

(52) U.S. Cl.
USPC ............. 429/218.2; 429/231.8; 429/209; 427/58; 427/122; 423/324; 423/351; 423/364; 423/414; 420/900

(58) Field of Classification Search
USPC ............. 429/218.2, 231.8, 209; 427/58, 427/122; 423/324, 351, 364, 414; 420/900
See application file for complete search history.

(56) References Cited

U.S. PATENT DOCUMENTS

| | | | |
|---|---|---|---|
| 6,306,541 B1 | 10/2001 | Dahn et al. | |
| 8,137,845 B2 | 3/2012 | Kim et al. | |
| 2006/0003227 A1 | 1/2006 | Aramata et al. | |
| 2007/0037063 A1 | 2/2007 | Choi et al. | |
| 2008/0020281 A1 | 1/2008 | Kogetsu et al. | |
| 2009/0075173 A1 | 3/2009 | Jeong et al. | |

FOREIGN PATENT DOCUMENTS

| | | | |
|---|---|---|---|
| CN | 101640269 A | | 2/2010 |
| EP | 1772429 A2 | | 11/2006 |
| JP | 10-97853 A | | 4/1998 |
| JP | 2948206 B1 | | 7/1999 |
| JP | 2001-210315 | | 8/2001 |
| JP | 2003-308837 A1 | | 10/2003 |
| JP | 2006-185901 | * | 7/2006 |
| JP | 2006-185901 A | | 7/2006 |
| JP | 2007-19027 A | | 1/2007 |
| JP | 2008-130560 A | | 6/2008 |
| JP | 2009-70825 A | | 4/2009 |
| KR | 10-2006-0048656 A | | 5/2006 |
| WO | WO 2005/057715 A1 | | 6/2005 |

OTHER PUBLICATIONS

KIPO Notice of Allowance dated Jan. 14, 2013, 5 pages.
JPO Office Action dated Dec. 19, 2012, 2 pages.
European Extended Search Report issued by the European Patent Office on May 3, 2013 regarding European Patent Application No. 10252208.3 in 5 pages.
Chinese First Office Action dated Jul. 30, 2013, issued in connection with corresponding Chinese Patent Application No. 201110172632.2.
Wenyuan Xu, "Working Principle and Progress of Amorphous Silicon Solar Cell", Physics, Nov. 30, 1989, vol. 18, No. 11, pp. 655-660.
Jian Hongbin, "Thermal-Wall LPCVD Preparation of a-Si 1-xCx:H Thin Film and study of the Structural Characteristics", Chinese Doctoral Dissertations & Master's Theses Full-Text Database, Aug. 31, 2006, No. 8, pp. 135-156.

* cited by examiner

*Primary Examiner* — Laura Weiner
(74) *Attorney, Agent, or Firm* — Knobbe Martens Olson & Bear, LLP

(57) ABSTRACT

Disclosed are a negative active material for a secondary lithium battery and a secondary lithium battery including the same. The negative active material for a secondary lithium battery includes an amorphous silicon-based compound represented by the following Chemical Formula 1.

$SiA_xH_y$                Chemical Formula 1

In Chemical Formula 1, A is at least one element selected from C, N, or a combination thereof, $0<x$, $0<y$, and $0.1 \leq x+y \leq 1.5$.

23 Claims, 1 Drawing Sheet

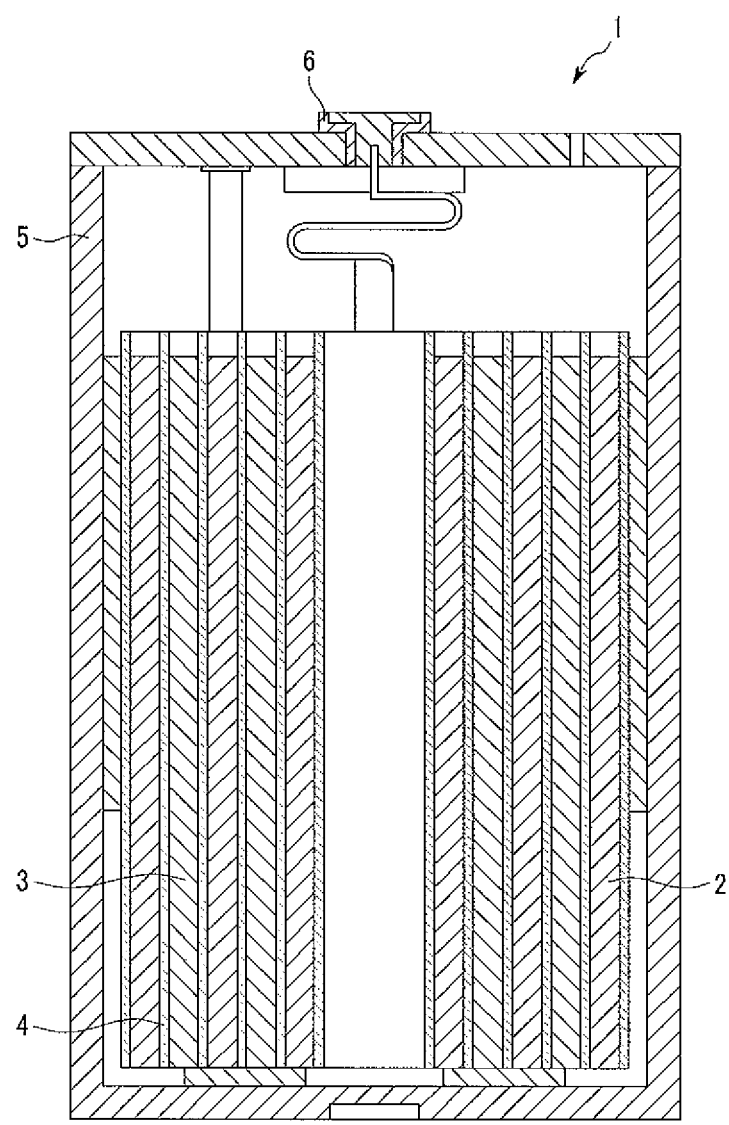

NEGATIVE ACTIVE MATERIAL FOR SECONDARY LITHIUM BATTERY AND SECONDARY LITHIUM BATTERY

CROSS-REFERENCE TO RELATED APPLICATIONS

This application claims priority to and the benefit of Provisional Patent Application No. 61/362,200 filed in the U.S. Patent and Trademark Office on Jul. 7, 2010, the entire contents of which are incorporated herein by reference.

BACKGROUND

1. Field

This disclosure relates to a negative active material for a secondary lithium battery, and a secondary lithium battery including the same.

2. Description of the Related Technology

Lithium secondary batteries have recently drawn attention as a power source for small portable electronic devices. They use an organic electrolyte solution and thereby have around twice the discharge voltage than a conventional battery using an alkali aqueous solution, and accordingly, have high energy density.

As for positive active materials of a secondary lithium battery, there has been research on a lithium-transition element composite oxide that can intercalate lithium, such as $LiCoO_2$, $LiMn_2O_4$, $LiNi_{1-x}Co_xO_2$ ($0<x<1$), and so on.

Negative active materials of a secondary lithium battery have included various carbon-based materials such as artificial graphite, natural graphite, and hard carbon, which can all intercalate and deintercalate lithium ions.

In addition, as a battery is increasingly required to have high energy density, much attention is drawn to a material that can be alloyed with lithium, for example, Si, Sn, Ge, oxides thereof, and alloys thereof, as a negative active material with high theoretical capacity density.

In particular, a Si oxide has good cycle characteristics, and has been widely researched.

However, the Si oxide has a problem that oxygen reacts with lithium (Li) and thus forms $Li_2O$ (lithium oxide). Accordingly, it may not only increase non-reversible capacity but may also deteriorate energy density of a battery, since the $Li_2O$ that does not participate in charge and discharge expands an electrode.

In addition, since the $Li_2O$ include an alkali component, it reacts with an electrolyte solution particularly under a high temperature atmosphere and thereby may bring about a problem of generating gas, deteriorating capacity, and the like.

SUMMARY

One aspect of the present embodiments provides a negative active material for a secondary lithium battery having high energy density and excellent initial charge and discharge efficiency and cycle-life characteristics.

Another aspect of the present embodiments provides a secondary lithium battery including the negative active material.

According to one embodiment, provided is a negative active material for a secondary lithium battery including an amorphous silicon-based compound represented by the following Chemical Formula 1.

$$SiA_xH_y \qquad \text{Chemical Formula 1}$$

In Chemical Formula 1,
A is at least one element selected from C, N, or a combination thereof,
$0<x$, $0<y$, and $0.1 \leq x+y \leq 1.5$.

The x may range from about 0.1 to about 1.2.
The y may range from about 0.03 to 0.5.

The silicon-based compound may be observed to have at least one peak selected from the group consisting of a peak at about 2200 $cm^{-1}$ (Si—H bond), a peak in about 740 $cm^{-1}$ to about 780 $cm^{-1}$ (Si—C bond), a peak at about 850 $cm^{-1}$ (Si—N bond), and a combination thereof in Fourier transform infrared (FT-IR) spectroscopy analysis.

The silicon-based compound may not be identified to have crystal-based SiC and crystal-based Si peaks, when X-ray diffraction (XRD) analysis is performed using a CuKα-ray.

The negative active material for a secondary lithium battery may include either of a Si—C bond or a Si—N bond and a Si—H bond in a ratio ranging from about 10:1 to about 2:1.

In particular, it may include either of a Si—C bond or a Si—N bond and a Si—H in a ratio of about 3:1.

The silicon-based compound may further include a carbon layer on the surface.

The carbon layer may be included in an amount ranging from about 5 wt % to 20 wt % based on the entire weight of the negative active material.

The carbon layer may be included in an amount ranging from about 5 wt % to 10 wt % based on the entire weight of the negative active material.

The negative active material for a secondary lithium battery may further include a binder and a conductive agent.

According to another embodiment, provided is a secondary lithium battery including a negative electrode including the negative active material, a positive electrode including a positive active material, and a non-aqueous electrolyte.

Hereinafter, further embodiments will be described in detail.

BRIEF DESCRIPTION OF THE DRAWINGS

FIG. 1 shows the structure of a secondary lithium battery according to one embodiment.

DETAILED DESCRIPTION

Example embodiments will hereinafter be described in detail. However, these embodiments are only examples, and the present embodiments are not limited thereto.

According to one embodiment, provided is a negative active material for a secondary lithium battery including a silicon-based compound represented by the following Chemical Formula 1.

$$SiA_xH_y \qquad \text{Chemical Formula 1}$$

In Chemical Formula 1,
A is at least one element selected from C, N, or a combination thereof,
$0<x$, $0<y$, and $0.1 \leq x+y \leq 1.5$.

Since the silicon-based compound is amorphous, it may bring about excellent cycle-life characteristics and particularly excellent high temperature cycle-life characteristics of a secondary lithium battery.

The x may be from about 0.1 to about 1.2. When the x is within the range, the covalent bond between silicon and carbon or between silicon and nitrogen is sufficiently strong so as to not break a particle. Accordingly, a lithium secondary battery including the active material may have excellent room temperature and high temperature cycle-life characteristics.

In addition, it may have excellent capacity, since it includes the active material having a stable silicon and carbon or silicon and nitrogen compound and smoothly intercalates and deintercalates lithium.

The y may be from about 0.03 to about 0.5. When it is within the range, it may increase non-crystallinity.

Since a silicon-based compound represented by the above Chemical Formula 1 does not react with Li and produce an oxide such as $Li_2O$, an active material may not be expanded and may also not have the side reaction of an electrolyte solution with $Li_2O$, a strong alkali.

The silicon-based compound is a compound of hydrogen (H), carbon (C), or nitrogen (N) covalently bonded with silicon (Si), which may not be physically mixed.

In addition, the covalent bond between hydrogen and carbon or between nitrogen and silicon in a silicon-based compound according to one embodiment may be identified to have at least one peak selected from the group consisting of a peak at about 2200 $cm^{-1}$ (Si—H bond), a peak in about 740 $cm^{-1}$ to about 780 $cm^{-1}$ (Si—C bond), a peak at about 850 $cm^{-1}$ (Si—N bond), and a combination thereof in the Fourier transform infrared (FT-IR) spectroscopy analysis.

In addition, since the silicon-based compound is amorphous, it may not be identified to have crystal-based, SiC, $Si_3N_4$, Si—C, Si—N and Si peaks, when the X-ray diffraction (XRD) analysis is performed using a CuKα-ray.

There is no peak in the FT-IR analysis if hydrogen, carbon, and nitrogen are not covalently bonded but are simply mixed with silicon as a mixture or composite.

In the above Chemical Formula 1, x and y values can be identified in the following method.

The x value of $SiC_xH_y$ can be calculated as follows. Tin (Sn) as an extractor is added to $SiC_xH_y$. Then, the mixture is heated at a temperature ranging from about 1200 to 1400° C. The tin (Sn) extracts silicon (Si), while carbon reacts with oxygen and thus generates carbon dioxide (CO2).

The amount of the carbon dioxide ($CO_2$) is measured as the x value of carbon (C).

As for $SiN_xH_y$, the x value can be obtained by adding tin (Sn) as an extractor thereto and heating the mixture at a temperature from about 1200 to about 1400° C. Then, the tin (Sn) extracts silicon (Si), generating nitrogen gas (N2).

The amount of the nitrogen gas ($N_2$) is measured as the x value of nitrogen (N).

As for $SiC_xH_y$ or $SiN_xH_y$, the y value can be acquired as follows. The silicon compound is heated under an inert atmosphere up to about 1500° C. and then generates hydrogen gas (H2).

The amount of the hydrogen gas ($H_2$) can be measured as the y value of hydrogen (H).

In this way, since a silicon-based compound according to one embodiment has a covalent bond between hydrogen and carbon or between nitrogen and silicon, it may not have a broken particle.

This aforementioned negative active material for a secondary lithium battery may include either of a Si—C bond or a Si—N bond and a Si—H bond in a ratio of about 10:1 to about 2:1, and preferably, about 3:1.

When it includes bonds within the range, a crystal product may be suppressed, which can prevent a crystalline silicon carbide or crystalline silicon nitride product.

The silicon-based compound may further include a carbon layer on the surface. Herein, the carbon layer may be included in an amount from about 5 wt % to 20 wt % based on the entire weight of the silicon-based compound and the carbon layer.

When a silicon-based compound includes a carbon layer on the surface, in particular, the amount of a carbon layer within the range, it may further improve electrical conductivity. Accordingly, since a lithium secondary battery can be better charged and discharged, the silicon-based compound can more improve initial charge and discharge efficiency and cycle-life characteristics of the battery.

The carbon layer may have a thickness from about 5 to about 30 nm. When it has a thickness within the range, the compound may be uniformly coated but includes less unnecessary carbon, preventing substantial deterioration of capacity of a battery.

The carbon layer may include amorphous carbon, crystalline carbon, or a mixture thereof.

The silicon-based compound can be prepared in a sputtering process using hydrogen gas and Si and C targets. The sputtering process can be appropriately conditioned to acquire a composition represented by the above Chemical Formula 1. In addition, the silicon-based compound may be prepared in a plasma method using hydrogen gas, silane gas, and nitrogen gas (N2).

However, a composition represented by the above Chemical Formula 1 can be prepared in any method for preparing a silicon-based compound.

Another embodiment provides a secondary lithium battery.

A secondary lithium battery can be classified into a lithium ion battery, a lithium ion polymer battery, and a lithium polymer battery depending on kinds of a separator and an electrolyte. It also can be classified to be cylindrical, prismatic, coin-type, pouch-type, and the like depending on shape. In addition, it can be bulk type and thin film type depending on size. The structure of these batteries and their manufacturing method are well-known in this field and may not be described in more detail here.

The secondary lithium battery according to another embodiment includes a negative electrode including the negative active material according to one embodiment, a positive electrode including a positive active material, and a non-aqueous electrolyte.

The negative electrode includes a negative active material layer including a negative active material and a current collector. Herein, the negative active material layer may be disposed by sputtering a negative active material to be a thin film on a current collector or by adding a negative active material to a solvent to prepare a slurry-type negative active material composition, and then coating the negative active material composition on a current collector.

The sputtering process may not need a binder for adhering a negative active material to a current collector.

The latter method of preparing an active material composition and coating it may further include a binder added to the negative active material composition.

When a binder is added to the negative active material composition, the binder may be included in an amount ranging from about 1 wt % to about 5 wt % based on the entire weight of the negative active material layer.

The binder improves properties of binding active material particles with one another and a negative active material with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and a combination thereof.

The water-soluble binder includes a styrene-butadiene rubber, an acrylated styrene-butadiene rubber, polyvinyl alcohol, sodium polyacrylate, a copolymer including propylene and a $C_2$ to $C_8$ olefin, a copolymer of (meth)acrylic acid and (meth) acrylic acid alkyl ester, or a combination thereof.

When the water-soluble binder is used, a cellulose-based compound may be further included to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of about 0.1 to about 3 parts by weight based on 100 parts by weight of the binder.

In addition, the negative active material composition may further include a solvent. Examples of the solvent may include N-methylpyrrolidone. In addition, when the binder is water soluble, the solvent may include water, but is not limited thereto.

The current collector may be may be selected from the group consisting of a copper foil, a nickel foil, a stainless steel foil, a titanium foil, a nickel foam, a copper foam, a polymer substrate coated with a conductive metal, and combinations thereof.

The positive electrode includes a current collector and a positive active material layer disposed on the current collector. The positive active material includes a lithiated intercalation compound that reversibly intercalates and deintercalates lithium ions. The positive active material may include a composite oxide including at least one selected from the group consisting of cobalt, manganese, and nickel, as well as lithium. In particular, the following lithium-containing compounds may be used. $Li_aA_{1-b}X_bD_2$ ($0.90 \le a \le 1.8$, $0 \le b \le 0.5$); $Li_aE_{1-b}X_bO_{2-c}D_c$ ($0.90 \le a \le 1.8$, $0 \le b \le 0.5$, and $0 \le c \le 0.05$); $LiE_{2-b}X_bO_{4-c}D_c$ ($0 \le b \le 0.5$ and $0 \le c \le 0.05$); $Li_aNi_{1-b-c}Co_bX_cD_\alpha$ ($0.90 \le a \le 1.8$, $0 \le b \le 0.5$, $0 \le c \le 0.05$, and $0 < \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, and $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, and $0 < a < 2$); $Li_aNi_{1-b-c}Mn_bX_cD_\alpha$ ($0.90 \le a \le 1.8$, $0 \le b \le 0.5$, $0 \le c \le 0.05$, and $0 < \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.05$, and $0 < \alpha < 2$); $Li_aNi_{1-b-c}Mn_bX_cO_{2-\alpha}T_2$ ($0.90 \le a \le 1.8$, $0 \le b \le 0.5$, $0 \le c \le 0.05$, and $0 < \alpha < 2$); $Li_aNi_bE_cG_dO_2$ ($0.90 \le a \le 1.8$, $0 \le b \le 0.9$, $0 \le c \le 0.5$, and $0.001 \le d \le 0.1$); $Li_aNi_bCO_cMn_dG_eO_2$ ($0.90 \le a \le 1.8$, $0 \le b \le 0.9$, $0 \le c \le 0.5$, $0 \le d \le 0.5$, and $0.001 \le e \le 0.1$); $Li_aNiG_bO_2$ ($0.90 \le a \le 1.8$, and $0.001 \le b \le 0.1$); $Li_aCoG_bO_2$ ($0.90 \le a \le 1.8$ and $0.001 \le b \le 0.1$); $Li_aMnG_bO_2$ ($0.90 \le a \le 1.8$ and $0.001 \le b \le 0.1$); $Li_aMn_2G_bO_4$ ($0.90 \le a \le 1.8$ and $0.001 \le b \le 0.1$); $QO_2$, $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above formulae, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

The compound may have a coating layer on the surface, or may be mixed with another compound having a coating layer. The coating layer may include at least one coating element compound selected from the group consisting of an oxide of a coating element, a hydroxide of a coating element, an oxy- hydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

The positive active material may be included in an amount from about 90 to about 98 wt % based on the total weight of the positive active material layer.

The positive active material layer also includes a binder and a conductive material. The binder and conductive material may be included in amounts of about 1 to about 5 wt % based on the total weight of the positive active material layer, respectively.

The binder improves properties of binding positive active material particles among one another and also, the positive active material with a current collector. Examples of the binder include polyvinyl alcohol, carboxylmethyl cellulose, hydroxypropyl cellulose, diacetyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to attribute conductivity to an electrode. It may include any electrically conductive material, unless it causes a chemical change. Examples of the conductive material include a carbon-based material such as natural graphite, artificial graphite, carbon black, acetylene black, ketjen black, a carbon fiber, and the like; a metal-based material such as a metal powder, a metal fiber, or the like that includes copper, nickel, aluminum, silver, and the like; a conductive polymer such as a polyphenylene derivative; or a mixture thereof.

The current collector may be aluminum (Al) but is not limited thereto.

The positive electrode may be obtained in a general process including mixing a positive active material, a binder, and selectively a conductive material in a solvent to prepare an active material composition, coating the active material composition on a current collector, and drying and pressing the same. The positive electrode-manufacturing method is well known and thus is not described in detail in the present specification. The solvent includes N-methylpyrrolidone or the like, but is not limited thereto.

The non-aqueous electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a $C_2$ to $C_{20}$ linear, branched, or cyclic hydrocarbon, a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio can be controlled in accordance with a desirable battery performance.

The carbonate-based solvent may be prepared by mixing a cyclic carbonate and a linear carbonate. The cyclic carbonate and the linear carbonate are mixed together in a volume ratio ranging from about 1:1 to about 1:9. When the mixture is used as an electrolyte, the electrolyte performance may be enhanced.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be represented by the following Chemical Formula 2.

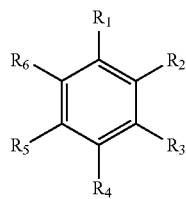

Chemical Formula 2

In Chemical Formula 2, $R_1$ to $R_6$ are independently selected from the group consisting of hydrogen, a halogen, a C1 to C10 alkyl group, a C1 to C10 haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include an additive of vinylene carbonate, an ethylene carbonate-based compound represented by the following Chemical Formula 3, or a combination thereof to improve cycle life.

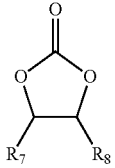

Chemical Formula 3

In Chemical Formula 3, $R_7$ and $R_8$ are independently selected from the group consisting of hydrogen, a halogen, a cyano group (CN), a nitro group ($NO_2$), and a C1 to C5 fluoroalkyl group, provided that at least one of $R_7$ and $R_8$ is selected from the group consisting of a halogen, a cyano group (CN), a nitro group ($NO_2$), and a C1 to C5 fluoroalkyl group, but both $R_7$ and $R_8$ are not hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive used to improve cycle life may be adjusted within an appropriate range.

The lithium salt is dissolved in an organic solvent and plays a role of supplying lithium ions in a battery, operating a basic operation of the secondary lithium battery, and improving lithium ion transportation between positive and negative electrodes therein. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, and $LiB(C_2O_4)_2$ (lithium bis(oxalato) borate; LiBOB). The lithium salt may be used in a concentration from about 0.1 M to about 2.0 M. When the lithium salt is included at the above concentration range, an electrolyte may have excellent performance and lithium ion mobility due to optimal electrolyte conductivity and viscosity.

FIG. 1 is a schematic view showing the representative structure of a secondary lithium battery according to one embodiment.

As shown in FIG. 1, the secondary lithium battery 1 includes a battery case 5 including a positive electrode 3, a negative electrode 2, and a separator interposed between the positive electrode 3 and the negative electrode 2, an electrolyte solution impregnated therein, and a sealing member 6 sealing the battery case 5.

The secondary lithium battery may further include a separator between the negative electrode and the positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate the present embodiments in more detail. These examples, however, are not in any sense to be interpreted as limiting the scope of this disclosure.

Fabrication of a Negative Electrode

Example 1

A negative electrode was fabricated by coating 2 μm-thick amorphous $SiC_{0.55}H_{0.05}$ on a 20 μm-thick Cu film using a 2-source sputtering apparatus in which Si and C target outputs were respectively set to be 400 W and 200 W, and 10 sccm of argon gas and 5 sccm of hydrogen gas were introduced into a chamber.

Example 2

A negative electrode was fabricated by coating 2 μm-thick amorphous $SiC_{0.15}H_{0.05}$ on a 20 μm-thick Cu film according to the same method as Example 1, except for setting a C target output to be 100 W rather than 200 W while keeping the same Si target output of 400 W.

Example 3

A negative electrode was fabricated by coating 2 μm-thick amorphous $SiC_{1.5}H_{0.05}$ on a 20 μm-thick Cu film according to the same method as Example 1, except for setting a C target output to be 300 W rather than 200 W while keeping the same Si target output of 400 W.

Example 4

A negative electrode was fabricated by disposing 500 μm-thick amorphous $SiC_{0.55}H_{0.05}$ on a 5 μm-thick SUS plate using a 2-source sputtering apparatus in which Si and C target outputs were respectively set to be 400 W and 200 W and hydrogen gas was introduced into a chamber. Then, the disposed layer was peeled off and pulverized into about 2 μm powder to prepare a negative active material. Herein, the layer was separated from a SUS plate by bending or impacting the plate and then grinding it.

87 wt % of the negative active material was mixed with 10 wt % of a polyimide (PI) binder and 3 wt % of an acetylene black (AB) conductive agent in an N-methylpyrrolidone solvent. The mixture was coated on a 20 μm-thick Cu film and then dried and compressed in a common method, fabricating a negative electrode.

Example 5

A negative electrode was fabricated by coating 2 μm-thick amorphous $SiC_{0.55}H_{0.15}$ on a 20 μm-thick Cu film according to the same method as Example 1, except for introducing 10 sccm of hydrogen gas.

Example 6

A negative electrode was fabricated by coating 2 μm-thick amorphous $SiC_{0.55}H_{0.45}$ on a 20 μm-thick Cu film according to the same method as Example 1, except for introducing 25 sccm of hydrogen gas.

Example 7

A negative electrode was fabricated by coating 2 μm-thick amorphous $SiC_{0.55}H_{0.03}$ on a 20 μm-thick Cu film according to the same method as Example 1, except for introducing 2 sccm of hydrogen gas.

Example 8

The $SiC_{0.55}H_{0.05}$ prepared in Example 4 was positioned on a glass board, and the glass board was positioned in the center of a tube furnace. The tube furnace was filled with argon gas and air was excluded therefrom. Next, the tube furnace was heated to 600° C. and filled with a gas mixture of toluene and argon gas mixed in a volume (%) ratio of 50:50 for about 30 minutes, and then with argon gas again. Then, the tube furnace was cooled and allowed to stand at room temperature, preparing a negative active material having conductivity and including $SiC_{0.55}H_{0.05}$ and a noncrystalline carbon layer formed on the surface thereof. Herein, the carbon layer was 5 wt % based on the entire weight of the $SiC_{0.55}H_{0.05}$ with the carbon layer thereon.

The negative active material was used to fabricate a negative electrode according to the same method as Example 4.

Example 9

A negative electrode was fabricated by coating 2 μm-thick amorphous $SiN_{0.55}H_{0.05}$ on a 20 μm-thick Cu film using a 1-source sputtering apparatus, in which a Si target output was set to be 400 W and nitrogen and hydrogen gases were filled in a chamber.

Example 10

A negative electrode was fabricated by coating 2 μm-thick amorphous $SiN_{0.15}H_{0.05}$ on a 20 μm-thick Cu film according to the same method as Example 9, except for setting a Si target output to be 600 W rather than 400 W.

Example 11

A negative electrode was fabricated by coating 2 μm-thick amorphous $SiN_{1.15}H_{0.05}$ on a 20 μm-thick Cu film according to the same method as Example 9, except for setting a Si target output to be 100 W rather than 400 W.

Example 12

A 500 μm-thick amorphous $SiN_{0.55}H_{0.05}$ layer was disposed on a 5 mm-thick SUS plate using a 1-source sputtering apparatus in which a Si target output was set to be 400 W and nitrogen and hydrogen gases were filled in a chamber. The layer was peeled off and pulverized into about 2 μm powder, preparing a negative active material. In particular, the disposed plate was bent impacted to separate the layer. The layer was ground with a ball mill.

87 wt % of the negative active material was mixed with 10 wt % of a polyimide (PI) binder and 3 wt % of an acetylene black (AB) conductive agent in an N-methylpyrrolidone solvent. The mixture was coated on a 20 μm-thick Cu film and then dried and compressed in a common method, fabricating a negative electrode.

Example 13

The $SiN_{0.55}H_{0.05}$ prepared in Example 12 was positioned on a glass board. The glass board was positioned in the center of a tube furnace. The tube furnace was filled with argon gas, and air was excluded therefrom. Next, the tube furnace was heated to 600° C. and filled with a mixture of toluene and argon gas mixed in a volume (%) ratio of 50:50. The tube furnace was cooled and allowed to stand at room temperature, preparing a negative active material including $SiN_{0.55}H_{0.05}$ and a noncrystalline carbon layer having conductivity on the surface thereof. Herein, the carbon layer was included in an amount of 5 wt % based on the entire weight of the $SiN_{0.55}H_{0.05}$ including the carbon layer thereon.

The negative active material was used in the same method as Example 9, fabricating a negative electrode.

Comparative Example 1

A negative electrode was fabricated by radiating an electron beam (EB) to Si and $SiO_2$ targets in a thermal evaporator to dispose a 2 μm-thick SiO layer on a 20 μm-thick Cu film.

Comparative Example 2

A negative electrode was fabricated by disposing 2 μm-thick amorphous $SiC_{1.55}H_{0.05}$ on a 20 μm-thick Cu film according to the same method as Example 1, except for setting an Si target output to be 200 W instead of 400 W and a C target output to be 400 W instead of 200 W.

Comparative Example 3

A negative electrode was fabricated by disposing 2 μm-thick amorphous $SiC_{0.015}H_{0.005}$ on a 20 μm-thick Cu film according to the same method as Example 1, except for setting a Si target output to be 600 W instead of 400 W and a C target output to be 20 W instead of 100 W.

Comparative Example 4

The powder-shaped negative active material according to Example 4 was heated under an argon atmosphere at 1200° C., promoting crystallization of Si and SiC.

87 wt % of the prepared negative active material was mixed with 10 wt % of a polyimide (PI) binder and 3 wt % of an acetylene black (AB) conductive agent in an N-methylpyrrolidone solvent. The mixture was coated on a 20 μm-thick Cu film and then dried and compressed in a common method, fabricating a negative electrode.

Comparative Example 5

The negative electrode was fabricated by coating 2 μm-thick amorphous $SiN_{1.55}H_{0.05}$ on a 20 μm-thick Cu film according to the same method as Example 6, except for setting a Si target output to be 200 W instead of 400 W.

Comparative Example 6

The negative electrode was fabricated by coating 2 μm-thick amorphous $SiN_{0.015}H_{0.005}$ on a 20 μm-thick Cu film according to the same method as Example 6, except for setting a Si target output to be 600 W instead of 400 W.

Comparative Example 7

The powder-shaped negative active material according to Example 9 was heated under an argon atmosphere at 1200° C., promoting crystallization of Si and SiN.

87 wt % of the prepared negative active material was mixed with 10 wt % of a polyimide (PI) binder and 3 wt % of an acetylene black (AB) conductive agent in an N-methylpyrrolidone solvent. The mixture was coated on a 20 μm-thick Cu film and then dried and compressed in a common method, fabricating a negative electrode.

Fabrication of a Half-Cell

The negative electrodes according to Examples 1 to 13 and Comparative Examples 1 to 7 were respectively used with a lithium metal counter electrode, fabricating a half-cell.

The half-cells were measured regarding reversible capacity and initial efficiency. The results are provided in the following Table 1.

When the cells were charged at a 0.05C rate to 0V, their capacities were measured as initial charge capacity. When they were discharged at a 0.05C rate to 1.5V, their capacities were measured as initial discharge capacity. Then, initial efficiency was calculated as initial discharge capacity/initial charge capacity.

Fabrication of a Secondary Lithium Battery Cell

A positive electrode was fabricated by mixing 95 wt % of a $LiCoO_2$ positive active material, 3 wt % of polyvinylidene fluoride (PVdF), and 2 wt % of acetylene black in an N-methylpyrrolidone solvent to prepare a positive active material slurry and coating the slurry on an Al film.

The positive electrode was used with each negative electrode according to Examples 1 to 13 and Comparative Examples 1 to 7, fabricating secondary lithium battery cells.

Herein, an electrolyte solution was prepared as a mixed solvent of ethylene carbonate, in which 1.0M $LiPF_6$ was dissolved, and diethyl carbonate mixed in a volume ratio of 1:1.

The secondary lithium battery cells were charged 300 times at a 0.2C rate to 4.2V and discharged at a 1.0C rate to 3V at a temperature of 45° C.

When the cells were charged and discharged once, they were measured regarding discharge capacities. When charged and discharged 300 times, they were again measured regarding discharge capacities. Percentage values were then calculated and are provided as cycle-life characteristics in the following Table 1.

TABLE 1

|  | Negative active material layer | Phase of active material | Capacity (mAh/g) | Efficiency (%) | 45° C., 300th cycle-life (%) |
|---|---|---|---|---|---|
| Example 1 | SiCxHy (x + y = 0.6) | amorphous | 2460 | 93 | 85 |
| Example 2 | SiCxHy (x + y = 0.2) | amorphous | 2930 | 95 | 73 |
| Example 3 | SiCxHy (x + y = 1.2) | amorphous | 1350 | 90 | 88 |
| Example 4 | SiCxHy (x + y = 0.6) + binder, conductive agent | amorphous | 2320 | 86 | 78 |
| Example 5 | SiCxHy (x + y = 0.7) | amorphous | 2065 | 86 | 87 |
| Example 6 | SiCxHy (x + y = 1.0) | amorphous | 1530 | 78 | 92 |
| Example 7 | SiCxHy (x + y = 0.58) | amorphous | 2680 | 90 | 73 |
| Example 8 | SiCxHy (x + y = 0.6) + carbon layer + binder, conductive agent | amorphous | 2115 | 91 | 82 |

TABLE 1-continued

| | Negative active material layer | Phase of active material | Capacity (mAh/g) | Efficiency (%) | 45° C., 300th cycle-life (%) |
|---|---|---|---|---|---|
| Example 9 | SiNxHy (x + y = 0.6) | amorphous | 2420 | 92 | 84 |
| Example 10 | SiNxHy (x + y = 0.2) | amorphous | 2860 | 94 | 74 |
| Example 11 | SiNxHy (x + y = 1.2) | amorphous | 1270 | 88 | 86 |
| Example 12 | SiNxHy (x + y = 0.6) + binder, conductive agent | amorphous | 1306 | 84 | 76 |
| Example 13 | SiNxHy (x + y = 0.6) + carbon layer + binder, conductive agent | amorphous | 2310 | 87 | 77 |
| Comparative Example 1 | SiO | amorphous | 1450 | 65 | 25 |
| Comparative Example 2 | SiCxHy (x = 1.6) | amorphous | 522 | 73 | 73 |
| Comparative Example 3 | SiCxHy (x = 0.02) | amorphous | 3630 | 97 | 5 |
| Comparative Example 4 | SiCxHy (x = 0.6) + binder, conductive agent | crystalline | 1650 | 76 | 53 |
| Comparative Example 5 | SiNxHy (x = 1.6) | amorphous | 473 | 62 | 69 |
| Comparative Example 6 | SiNxHy (x = 0.02) | amorphous | 3520 | 61 | 7 |
| Comparative Example 7 | SiNxHy (x = 0.6) + binder, conductive agent | crystalline | 1642 | 75 | 50 |

As shown in Table 1, secondary lithium battery cells respectively including the negative active materials according to Examples 1 to 3, 5 to 7, 9 and 10 had excellent capacity, efficiency, and cycle-life characteristics. The negative active materials according to Examples 4, 8, 12, and 13 were prepared by grinding a silicon-based compound into powder and had somewhat deteriorated initial charge and discharge efficiency or 45° C. cycle-life characteristic, but no large deterioration compared with the ones of Examples 1 to 3, 5 to 7, 9, and 10. In particular, when an active material is prepared as a powder as shown in Examples 8 and 13, it is better treated to be conductive on the surface.

Secondary lithium battery cells respectively including the negative active materials according to Comparative Examples 1 to 7 had deteriorated cycle-life characteristics. In particular, those of Comparative Examples 3 and 6 had sharply deteriorated cycle-life characteristics. In addition, those of Comparative Example 2 and 5 had appropriate cycle-life but poor capacity and efficiency characteristics. The SiO negative active material of Comparative Example 1 had deteriorated initial efficiency, since lithium reacted with oxygen and thus produced $Li_2O$. In addition, an electrolyte solution was decomposed due to a $Li_2O$ catalyst, which is strongly alkali, and formed a layer on the surface of a negative electrode, which causes resistance.

Furthermore, Comparative Examples 2 and 5 having an x+y value of 1.5 or more might easily have partially crystalline SiC or $Si_3N_4$, which is an insulator against lithium. Accordingly, they may have extremely high resistance and deteriorated capacity and high input and output characteristics. When C and N or H increase, initial charge and discharge efficiency is reduced.

In general, the smaller the x+y value, the higher capacity. When the x+y value is 0.1 or less as in Comparative Examples 3 and 6, a negative active material may easily become crystalline, causing a breakup on the crystal interface and deteriorating conductivity and thus cycle-life.

Comparative Example 4 had large Si, SiC, or $Si_3N_4$ crystals identified by XRD, since an amorphous material became non-uniform through heat treatment at a high temperature. Accordingly, the large crystals became cracked on the interface and broken despite a Si—C covalent bond therein, as the active material was repeatedly expanded and contracted during the charge and discharge, deteriorating initial capacity and cycle-life characteristics.

While this disclosure has been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims.

What is claimed is:

1. A negative active material for a secondary lithium battery, wherein the negative active material is represented by Formula 1;

$$SiA_xH_y$$

wherein A is at least one element selected from C, N, or a combination thereof, wherein $0<x$, $0<y$, and $0.1 \leq x+y \leq 1.5$.

2. The negative active material of claim 1, wherein the negative active material is amorphous.

3. The negative active material of claim 1, wherein x is from about 0.1 to about 1.2.

4. The negative active material of claim 1, wherein y is from about 0.03 to about 0.5.

5. The negative active material of claim 1, wherein the negative active material has a peak at about 2200 cm$^{-1}$ in Fourier transform infrared (FT-IR) spectroscopy analysis.

6. The negative active material of claim 1, wherein the negative active material has at least one peak selected from the group consisting of a peak in about 740 cm$^{-1}$ to about 780 cm$^{-1}$ and a peak at about 850 cm$^{-1}$ in Fourier transform infrared (FT-IR) spectroscopy analysis.

7. The negative active material of claim 1, wherein the negative active material has a ratio of Si—C bonds to Si—H bonds of from about 10:1 to about 2:1, or
    a ratio of a Si—N bonds to Si—H bonds of from about 10:1 to about 2:1 or both.

8. The negative active material of claim 1, further comprising a carbon layer on a surface of the negative active material.

9. The negative active material of claim 8, wherein the carbon layer comprises noncrystalline carbon.

10. The negative active material of claim 8, wherein the carbon layer is present in an amount from about 5 wt % to about 20 wt % based on the entire weight of the negative active material.

11. The negative active material of claim 8, wherein the carbon layer has a thickness of from about 5 nm to about 30 nm.

12. The negative active material of claim 1, wherein the negative active material does not have a crystal-based $Si_3N_4$ peak, a crystal-based SiC peak or a crystal-based Si peak when X-ray diffraction (XRD) analysis is performed on the negative active material using a CuKα ray.

13. The negative active material of claim 1, wherein the negative active material comprises at least one of $SiN_{0.55}H_{0.05}$, $SiN_{0.15}H_{0.05}$, $SiN_{1.15}H_{0.05}$, $SiC_{0.55}H_{0.05}$, $SiC_{0.15}H_{0.05}$, and $SiC_{1.15}H_{0.05}$.

14. A secondary lithium battery comprising a negative electrode comprising a current collector and a negative active material, wherein the negative active material is represented by Formula 1:

$$SiA_xH_y$$

wherein A is at least one element selected from C, N, or a combination thereof,
wherein $0<x$, $0<y$, and $0.1 \le x+y \le 1.5$.

15. The secondary lithium battery of claim 14, wherein the negative active material is amorphous.

16. The secondary lithium battery of claim 14, wherein x is from about 0.1 to about 1.2.

17. The secondary lithium battery of claim 14, wherein y is from about 0.03 to about 0.5.

18. The secondary lithium battery of claim 14, wherein the negative active material has a peak at about 2200 $cm^{-1}$ in Fourier transform infrared (FT-IR) spectroscopy analysis.

19. The secondary lithium battery of claim 14, wherein the negative active material has at least one peak selected from the group consisting of a peak in about 740 $cm^{-1}$ to about 780 $cm^{-1}$ and a peak at about 850 $cm^{-1}$ in Fourier transform infrared (FT-IR) spectroscopy analysis.

20. The secondary lithium battery of claim 14, wherein the negative active material has a ratio of Si—C bonds to Si—H bonds of from about 10:1 to about 2:1, or
    a ratio of a Si—N bonds to Si—H bonds of from about 10:1 to about 2:1 or both.

21. The secondary lithium battery of claim 14, further comprising a carbon layer on a surface of the negative active material.

22. The secondary lithium battery of claim 21, wherein the carbon layer comprises noncrystalline carbon.

23. The secondary lithium battery of claim 21, wherein the carbon layer is present in an amount from about 5 wt % to about 20 wt % based on the entire weight of the negative active material.

* * * * *

UNITED STATES PATENT AND TRADEMARK OFFICE
CERTIFICATE OF CORRECTION

PATENT NO. : 8,551,655 B2  Page 1 of 1
APPLICATION NO. : 12/947789
DATED : October 8, 2013
INVENTOR(S) : Sumihito Ishida et al.

It is certified that error appears in the above-identified patent and that said Letters Patent is hereby corrected as shown below:

In the Specification

Column 5, Line 37, Change "0<a<2);" to --0<α<2);--.

Column 5, Line 38, Change "$Li_aNi_{1-b-c}Mn_bX_cO_{2-\alpha}T_2$" to --$Li_aNi_{1-b-c}Mn_bX_cO_{2-\alpha}T_\alpha$--.

Signed and Sealed this
Thirty-first Day of May, 2016

Michelle K. Lee
*Director of the United States Patent and Trademark Office*